F. D. KECHLEY.
GRAIN SEPARATOR.
APPLICATION FILED APR. 22, 1910.
1,060,457.
Patented Apr. 29, 1913.
2 SHEETS—SHEET 1.
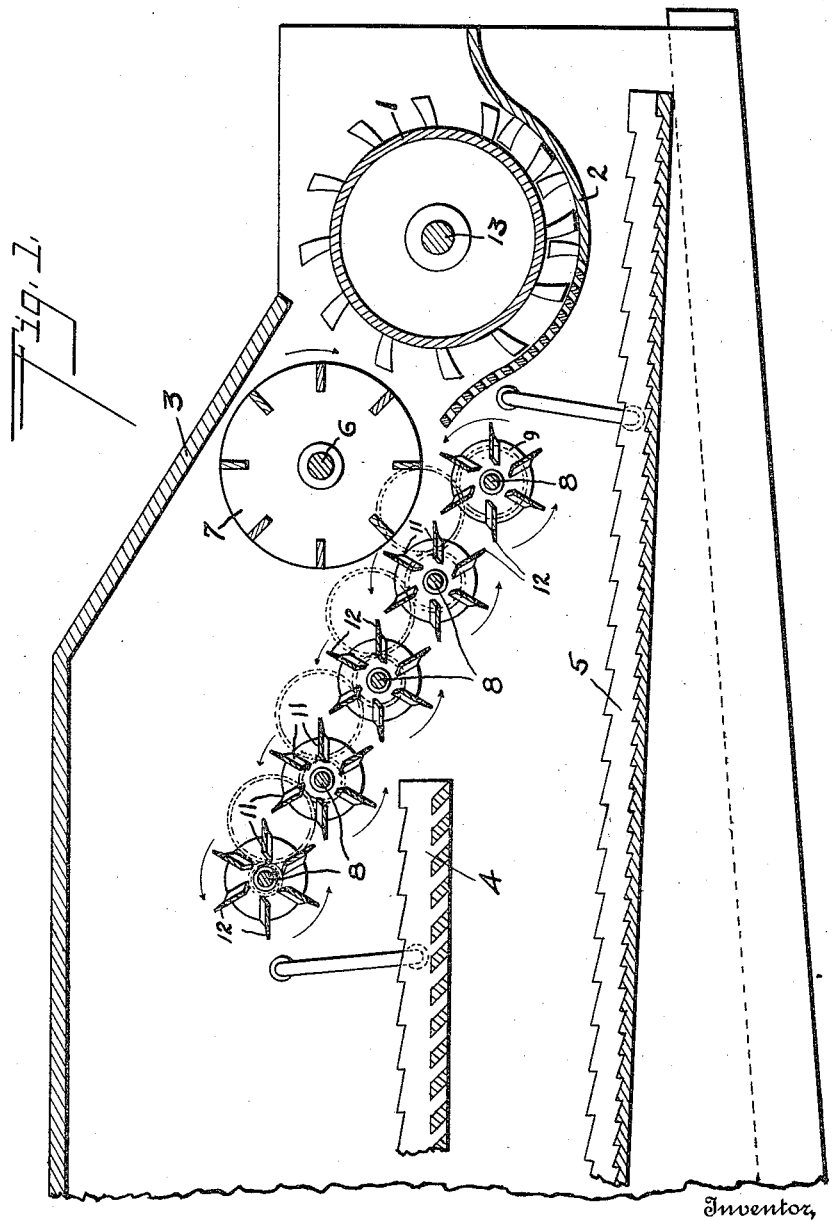
Inventor,
Frank D. Kechley.
Witnesses:
By David O. Barnell,
Attorney.

F. D. KECHLEY.
GRAIN SEPARATOR.
APPLICATION FILED APR. 22, 1910.
1,060,457.
Patented Apr. 29, 1913.
2 SHEETS—SHEET 2.
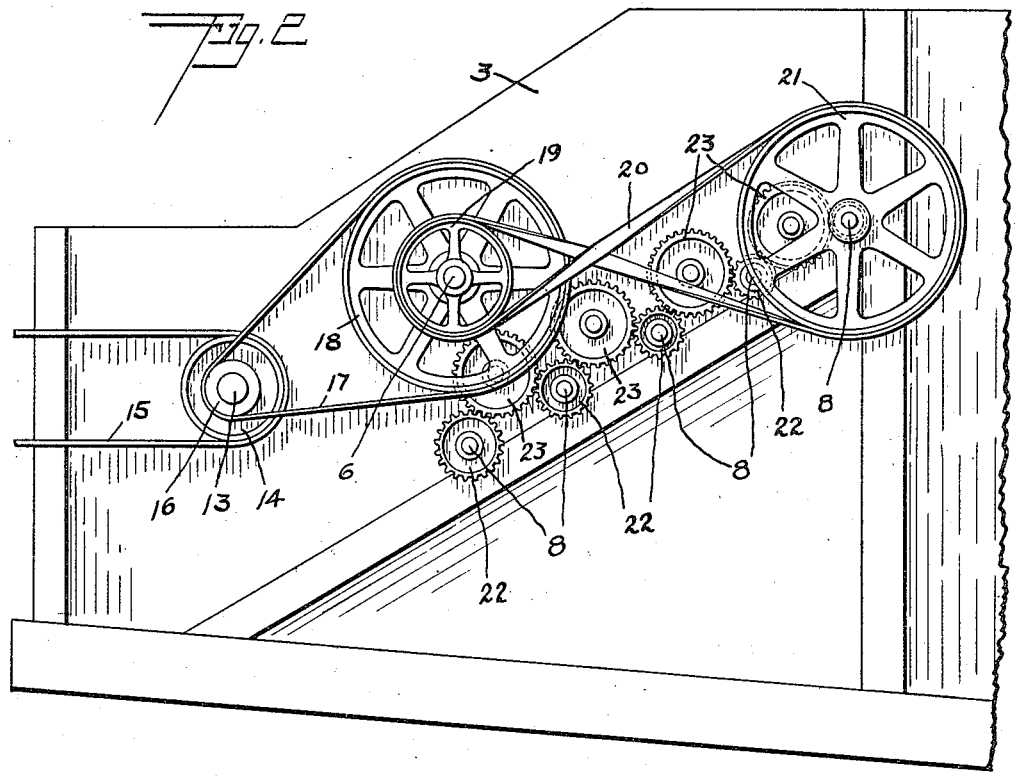
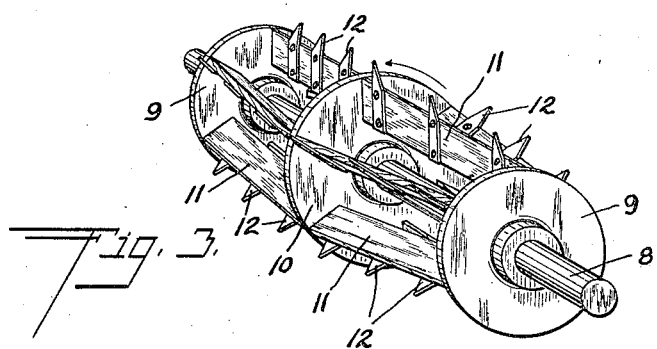
Frank D. Kechley, Inventor.

UNITED STATES PATENT OFFICE.

FRANK D. KECHLEY, OF BEATRICE, NEBRASKA.

GRAIN-SEPARATOR.

1,060,457.  Specification of Letters Patent.  Patented Apr. 29, 1913.

Application filed April 22, 1910. Serial No. 557,028.

*To all whom it may concern:*

Be it known that I, FRANK D. KECHLEY, a citizen of the United States, residing at Beatrice, in the county of Gage and State of Nebraska, have invented certain new and useful Improvements in Grain-Separators, of which the following is a specification.

My invention relates to grain threshing and separating machinery, and it is the object thereof to provide in a grain separator means for spreading out, thinning and pulling apart the mass or stream of straw emerging from the threshing cylinder, before the same passes onto the vibrating straw-racks of the separating mechanism.

It has been found that the threshing of grain may be done with a smaller proportionate expenditure of power by the use of threshing cylinders of greater diameter and weight than were in use until recent years. The use of such large threshing cylinders has, however, been attended by disadvantages arising from the greater thickness and compactness of the stream of straw which emerges from the threshing cylinder, it being difficult to secure an efficient separation of the grain from the mass until the same has been spread out, thinned and loosened so as to release the grain inclosed in the mass. My invention provides a means by which the stream of straw may be spread out both transversely and longitudinally to the direction of movement thereof, and thus pulled apart and loosened before passing onto the vibrating separating devices.

Constructions embodying my invention are illustrated in the accompanying drawings, in which—

Figure 1 is a partial longitudinal sectional view of a grain separator provided with my devices, Fig. 2 is a side elevation showing the driving mechanism, and Fig. 3 is a perspective view of one of the spreading and hackling reels.

In the construction shown in the drawings there are provided a toothed cylinder 1 and concaves 2 which are arranged in the ordinary manner at the front end of the separator casing 3. The front end portions only of the vibrating straw-rack 4 and grain-pan 5 are shown, but it will be understood that these elements of the separating mechanism may be of any suitable and preferred structure. Above and slightly behind the threshing cylinder is a transverse shaft 6 which carries a plain beating reel 7. In a plane extending upwardly and rearwardly from the cylinder are arranged a series of transversely extending shafts 8 which carry the spreading and hackling reels. The detailed construction of said reels is clearly shown in Fig. 3, each of the same comprising two circular end-plates 9, a center-plate 10, a series of slats 11 arranged between and secured to the plates 9 and 10, and a series of teeth 12 secured upon the slats. The center-plates 10 are of larger diameter than the end-plates 9 so that the slats have an inward axial inclination from the center of the reels toward the ends thereof. In addition to said axial inclination the slats have a circumferential inclination, the direction of which from the center to the ends of a reel is rearward with reference to the direction of rotation of the reel. The inclination of the slats in the two ways above mentioned may be defined as being such that the outer edges thereof approximate the form of portions of a conical helix of large pitch. The teeth 12 are secured upon the front sides of the slats and the protruding portions thereof are inclined slightly backward with reference to the direction of rotation of the reel, so that the same have no tendency to catch and drag the straw around with the reel instead of releasing it after it has passed over the upper portion of the reel. The teeth upon the adjoining slats of any reel are in staggered longitudinal relation to each other. The relation of the diameters of the reels to the distances from center to center thereof are such that the paths of the teeth on adjoining reels overlap each other at the central portions of the reels. In order that the overlapping teeth may not interfere with each other, the teeth of adjoining reels are arranged at different longitudinal positions thereon.

The shafts 8 which carry the reels are arranged to be driven at different speeds, that nearest to the threshing cylinder moving at the lowest speed and that farthest from the cylinder moving at the highest speed. A simple and convenient driving mechanism for this purpose is shown in Fig. 2. The cylinder shaft 13 carries the main driving pulley 14 which is connected by the belt 15 with any suitable source of power. A pulley 16 on the cylinder shaft is connected by a belt 17 with a pulley 18 on the shaft 6 of the beating reel 7. The shaft 6 carries a pulley 19 which is connected by a belt 20 with a pulley 21 on one of the shafts 8. The shafts 8 are connected by a gear train consisting of alternate pinions 22 and idler gears 23, the pinions being mounted upon the ends of the shafts and the idler gears being suitably mounted upon the side of the casing 3. The pinions 22 are graduated in size, the largest being upon the shaft nearest the cylinder and the smallest being upon the shaft most remote from the cylinder. The shafts are thus driven at the proper relative speeds which are determined by the relative sizes of the pinions, being inversely proportional to the diameters thereof.

From the foregoing the operation of the spreading and hackling reels will be apparent. The stream or mat of straw emerging from the cylinder and concaves is received upon and elevated by the said reels, being first directed thereonto by the upper or beating reel 7. As the material is carried upward by the reels, the inclination of the slats 11 causes the same to be directed toward the ends of the reels, which, as the mat is usually thickest at its central portion, causes it to be more uniformly distributed transversely to its line of movement. As the mass of straw moves upwardly its movement becomes accelerated owing to the increased speed of rotation of the shafts carrying the upper reels. This acceleration results in a further thinning of the mat by pulling the same out longitudinally or in the direction of movement of the mass. Both the transverse and longitudinal thinning of the mat is assisted by the teeth 12 which, by penetrating the mass, enable the movement of the reels to be more effectually communicated thereto. It will be apparent that a large proportion of the grain inclosed by the straw will be beaten and shaken out of the same by the action of the reels and will fall through the reels to be caught by the grain-pan 5 arranged below the same, while the straw after passing over the reels and onto the vibrating straw-rack 4 will be so loosened and uniformly distributed over the surface of the rack as to permit a rapid and effective separation of the grain therefrom.

Now, having described my invention, what I claim and desire to secure by Letters Patent is:

1. A grain separating reel comprising two sets of oppositely disposed slats and slat supporting means, the slats having their inner edges spaced to provide a substantially vertical clearance for grain and the slats of one set inclining outwardly and rearwardly in opposition to the slats of the other set to equalize the mat of straw passing thereover.

2. A grain separating reel comprising a middle and end supports, the latter being of like diameter which is less than that of the middle support, two sets of slats secured at their ends to the supports and spaced at their inner edges to provide clearance for the grain to drop vertically through the reel, the slats inclining outwardly and rearwardly from the middle support to spread the straw laterally, and teeth projecting outwardly from the slats with their outer rear edges inclined.

3. A rotatable reel for grain separators comprising a shaft, a center plate and end plates carried by the shaft, one set of slats arranged between the center plate and one of the end plates, another set of slats arranged between the center plate and the other end plate, both sets of slats being secured to the respective plates adjacent the peripheries of the plates with their inner edges spaced from said shaft and from one another to permit grain to fall through the reel between the slats, both sets of slats being inclined from the center plate inwardly with reference to the shaft and being inclined rearwardly with reference to the direction of rotation of the reel with the inner ends of the slats of one set arranged opposite the inner ends of the slats of the other set whereby the straw is spread outwardly from the center toward opposite ends of the reel, and hackling teeth secured upon said slats and projecting beyond the outer edges of the slats to engage the straw to assist in advancing and thinning out the straw longitudinally and transversely of the separator as it is fed over the reel.

In testimony whereof I have hereunto subscribed my name in the presence of two witnesses.

FRANK D. KECHLEY.

Witnesses:
H. E. SPAFFORD,
THOS. E. STEWART.

---

Copies of this patent may be obtained for five cents each, by addressing the "Commissioner of Patents, Washington, D. C."